United States Patent
Matsubara et al.

(10) Patent No.: US 12,308,771 B2
(45) Date of Patent: May 20, 2025

(54) MOTOR CONTROL DEVICE

(71) Applicant: Hitachi Industrial Equipment Systems Co., Ltd., Tokyo (JP)

(72) Inventors: Mitsuru Matsubara, Tokyo (JP); Yuuri Takano, Tokyo (JP); Yusuke Uei, Tokyo (JP); Terutomo Kondo, Tokyo (JP); Tetsuo Yanada, Tokyo (JP); Kazuaki Tobari, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 18/271,542

(22) PCT Filed: Dec. 14, 2021

(86) PCT No.: PCT/JP2021/046102
§ 371 (c)(1),
(2) Date: Jul. 10, 2023

(87) PCT Pub. No.: WO2023/276198
PCT Pub. Date: Jan. 5, 2023

(65) Prior Publication Data
US 2024/0072704 A1 Feb. 29, 2024

(30) Foreign Application Priority Data
Jun. 29, 2021 (JP) .................. 2021-107666

(51) Int. Cl.
*H02P 23/04* (2006.01)
*H02P 23/14* (2006.01)
*H02P 23/18* (2016.01)

(52) U.S. Cl.
CPC .............. *H02P 23/04* (2013.01); *H02P 23/14* (2013.01); *H02P 23/18* (2016.02)

(58) Field of Classification Search
CPC .......... H02P 23/04; H02P 23/14; H02P 23/18; H02P 21/05; H02P 29/024; G05B 13/02
(Continued)

(56) References Cited

U.S. PATENT DOCUMENTS 5,886,491 A * 3/1999 Yoshida ............... G05B 13/024
318/632
10,186,990 B2 * 1/2019 Sumioka .............. H10N 30/802

FOREIGN PATENT DOCUMENTS

JP          10-210781 A    8/1998
JP       2005-168225 A     6/2005
(Continued)

OTHER PUBLICATIONS

International Search Report (PCT/ISA/210) issued in PCT Application No. PCT/JP2021/046102 dated Feb. 15, 2022 with English translation (4 pages).
(Continued)

*Primary Examiner* — David Luo
(74) *Attorney, Agent, or Firm* — Crowell & Moring LLP

(57) ABSTRACT

A motor-controller device includes a position control system that controls the position of a machine end connected to the motor. The motor-controller device receives a first speed directive from a high-level controller, stored in the position control system to output a motor axis position response to the high-level controller, including speed controller and vibration controller in speed control system. The vibration controller includes a position-command estimator that calculates an estimate of the location directive based on the first speed directive and the motor axis position response, a parallel vibration damping controller that extracts frequency components that excite vibration of the machine end
(Continued)

included in the first speed directive based on the estimated value of the location directive, and outputs the extracted frequency components.

12 Claims, 14 Drawing Sheets

(58) Field of Classification Search
USPC .................................................. 318/611, 560
See application file for complete search history.

(56) References Cited

FOREIGN PATENT DOCUMENTS

| | | |
|---|---|---|
| JP | 2008-228360 A | 9/2008 |
| JP | 2019-133494 A | 8/2019 |

OTHER PUBLICATIONS

Japanese-language Written Opinion (PCT/ISA/237) issued in PCT Application No. PCT/JP2021/046102 dated Feb. 15, 2022 (4 pages).

* cited by examiner

Vibration controller in speed control system

MOTOR CONTROL DEVICE

TECHNICAL FIELD

This invention relates to a controller for motors.

BACKGROUND ART

In the case of driving a machine to be controlled by a motor control system in a semi-closed configuration. When the rigidity of the machine is low, the resonance/anti-resonance characteristics of the machine may cause the end of the machine (hereinafter described as the machine end) to vibrate at a low frequency of several Hz to 100 Hz, making it impossible to achieve the desired response characteristics.

In the factory automation field, where both positioning accuracy and time required for positioning must be reduced, damping control is generally used. Damping control is generally achieved by processing control commands, and methods are known to remove frequency components that excite vibration at the machine end from the control commands.

The patent document 1 makes it possible to damp the end of a machine even when the resonance/anti-resonance characteristics of the machine change by switching between two damping filters for the location directive, and a notch filter is an example of a damping filter.

CITATION LIST

Patent Document

Patent Documents 1 Patent Publication No. 2005-168225

SUMMARY OF THE INVENTION

Problems to be Solved by the Invention

If the motor control system is a position control system, damping control can be realized by processing the location directive using a notch filter, etc. However, as shown in FIG. 2, for industrial reasons such as equipment replacement, the high-level controller that generates the location directive may encompass the position controller, while the servo motor controller takes care of the speed control system, which is a minor loop.

Furthermore, for reasons such as ease of maintenance and specifications of each device, it may be desirable to realize damping control in the servo motor controller, which is responsible for the minor loop speed control system, instead of damping control in the position controller.

In the patent document 1, the damping filter 3, filter switching means 9, and command direction detecting means 4, which contribute to damping control, are configured to realize damping control in the high-level controller in FIG. 2. Therefore, in the patent document 1, damping control is not realized in the servo motor controller, which is responsible for the speed control system.

Furthermore, when damping control is performed using a line enhancer (LE) as a filter to extract the frequency components that excite machine end vibration, the problem is to avoid the response delay that is characteristic of damping control.

The purpose of this invention is to provide a motor control device that improves the response delay characteristic of damping control in a motor control system with a semi-closed structure, where the high-level controller includes a position controller and damping control is realized in the motor control device that is responsible for the speed control system.

This invention is a motor controller device comprising a position control system that controls the position of a machine end connected to a motor, wherein the motor controller device receiving the first speed directive from the high-level controller, stored in the position control system to output a motor axis position response to the high-level controller, comprising speed controller and vibration controller in speed control system, wherein the vibration controller in speed control system comprising: a position command estimator that calculates an estimate of the location directive based on the first speed directive and the motor axis position response, a parallel vibration damping controller that extracts the frequency components that excite vibration of the machine end included in the first speed directive based on the estimated value of the location directive, and outputs the extracted frequency components. the parallel vibration damping controller outputs the extracted frequency components, a phase regulator to improve the response delay caused by the parallel vibration damping controller, a first unit converter that converts the output of the phase regulator into the dimension of velocity, and an arithmetic unit wherein the arithmetic unit, the output of the parallel vibration damping controller is subtracted from the first speed directive to remove from the first speed directive the frequency components that excite vibration at the machine end, and output as a second speed directive, the first real speed directive as an output of the vibration controller in speed control system based on the output of the first unit converter and the second speed directive, uses the first real speed directive as a command for the speed controller.

Effects of the Invention

According to the present invention, the response delay peculiar to damping control can be improved and positioning time can be reduced when damping control is realized in the motor control unit that is responsible for the speed control system.

MODE FOR CARRYING OUT THE INVENTION

Figure 3:
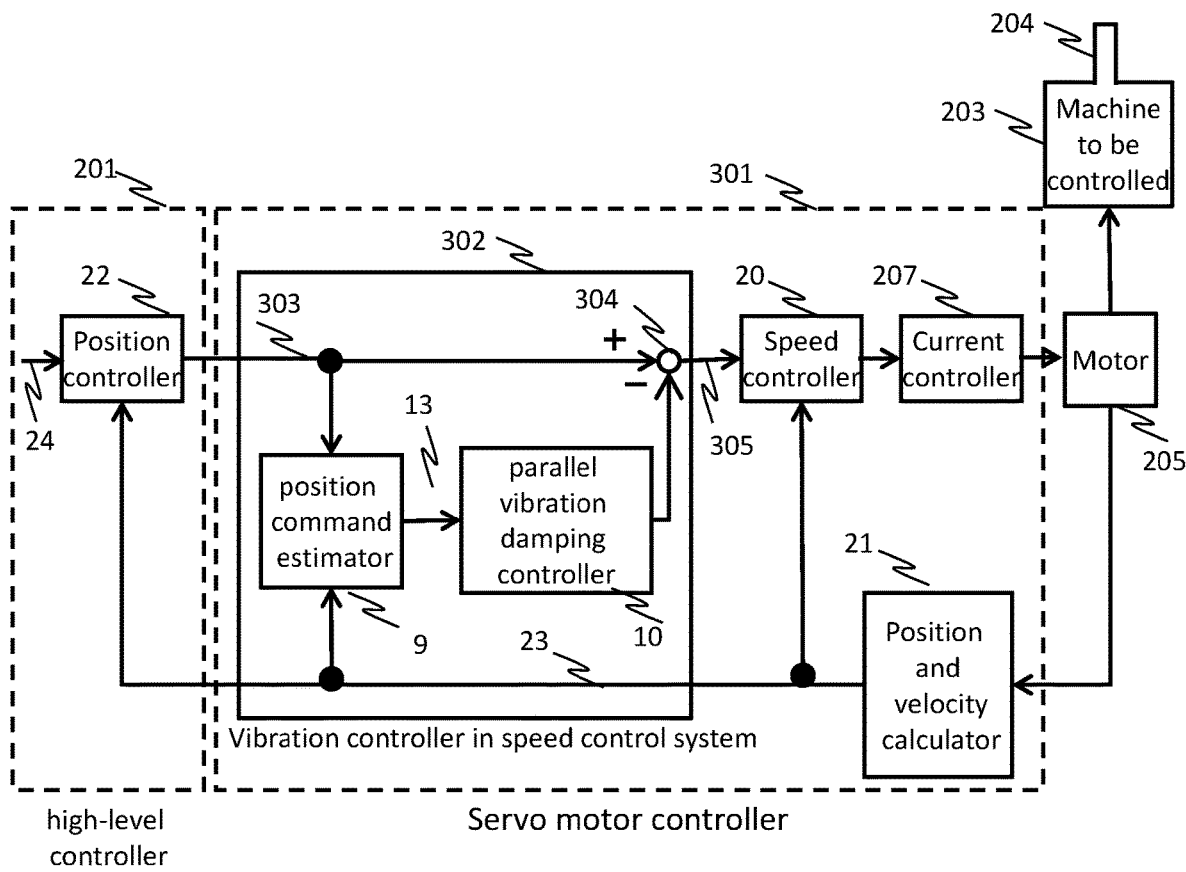
FIG. 3: Diagram explaining the premise of Example 1.

First, an explanation of FIG. 3 as the premise configuration for this example is given. FIG. 3 is a technique to realize damping control within servo motor controller 301 without processing the location directive. The servo motor controller 301 in FIG. 3 is composed of position command estimator 9, parallel vibration damping controller 10, speed controller 20, position and velocity calculator 21, current control system 207, and adder and subtractor 304, and processes speed directive 303 obtained from high-level controller 201.

More specifically, the parallel vibration damping controller 10 is comprising a vibrating excitation component extractor and a unit converter.

The vibration excitation component extractor extracts the frequency components that excite vibration at the machine end 204 from the location directive estimate 13 obtained from the position command estimator 9, the unit converter converts them into units of speed, vibration suppression of the machine end is achieved by removing the vibration excitation components from the speed directive 303.

In FIG. 3, the vibrating excitation component extractor in the parallel vibration damping controller 10 employs the following formula corresponding to a line enhancer (LE) as a filter that can extract the frequency components that excite machine end vibration from the position command estimator 9 without phase delay.

[Formula 1]

$$LE = \frac{2WL\omega_n \cdot s}{s^2 + 2W\omega_n \cdot s + \omega_n^2} \quad (1)$$

However, W is the extraction width, L is the parameter responsible for the extraction power level, and ωn is the frequency to be extracted [rad/s]. Also, s is the Laplace operator (henceforth, s means the Laplace operator).

Figure 4:
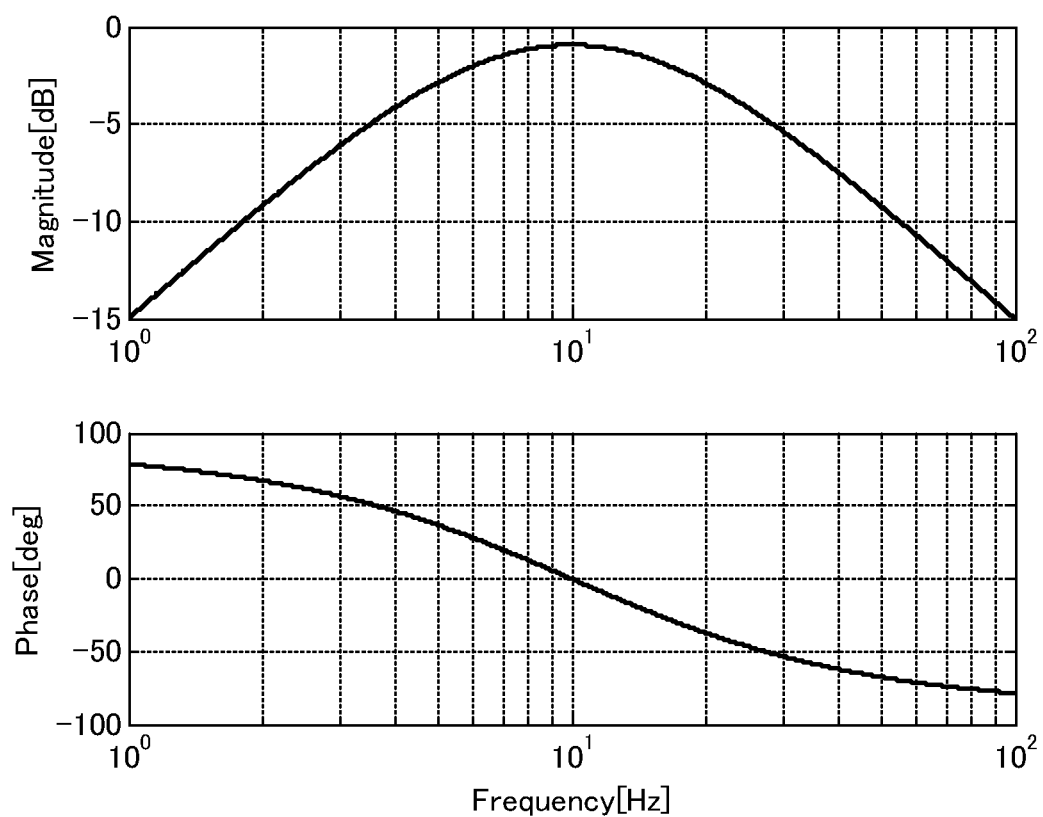
FIG. 4: Frequency characteristics of the vibrating excitation component extractor.

The frequency characteristics of formula (1) when W=1, L=0.1, and ωn=2π×10 are shown in FIG. 4. It is characterized by the fact that the amplitude reaches its peak at frequency ωn and the phase delay is zero.

The vertical axis in the upper row of FIG. 4 is magnitude (amplitude of the frequency to be extracted) and the horizontal axis is Frequency (frequency of the waveform to be extracted). The vertical axis in the lower part of FIG. 4 is phase (phase of the frequency to be extracted) and the horizontal axis is frequency (frequency of the waveform to be extracted).

In damping control using LE in formula (1), the occurrence of response delay peculiar to damping control is an issue. Specifically, a phase delay occurs in the band below the frequency ωn, and while vibration at the machine end can be suppressed, sufficient response characteristics cannot be obtained, and the positioning time may not be sufficiently shortened.

The following example of the application of the present invention is a configuration to improve the response delay peculiar to damping control, and will be explained with reference to the drawings. In each figure, components that have a common function are given the same number, and their explanations are omitted. "Feedback" may be abbreviated as "FB" and "feedforward" as "FF."

EXAMPLE 1

Figure 1:
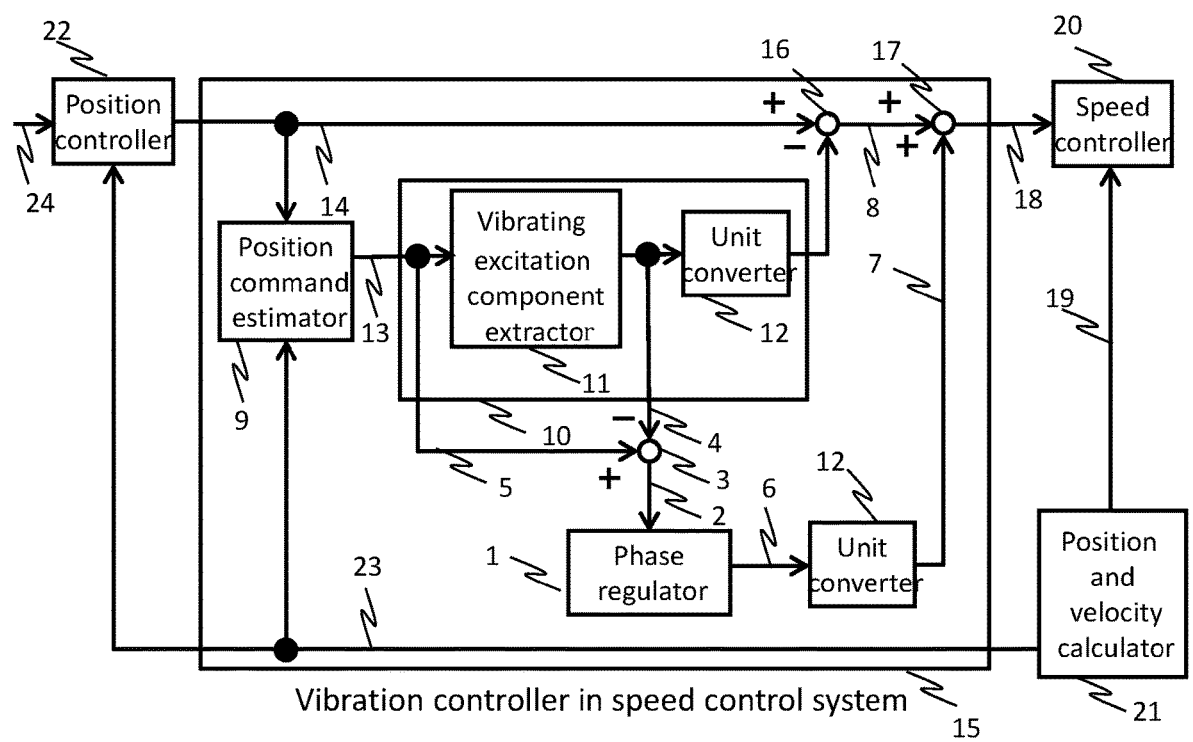
FIG. 1: The first basic configuration of Example 1.
Figure 2:
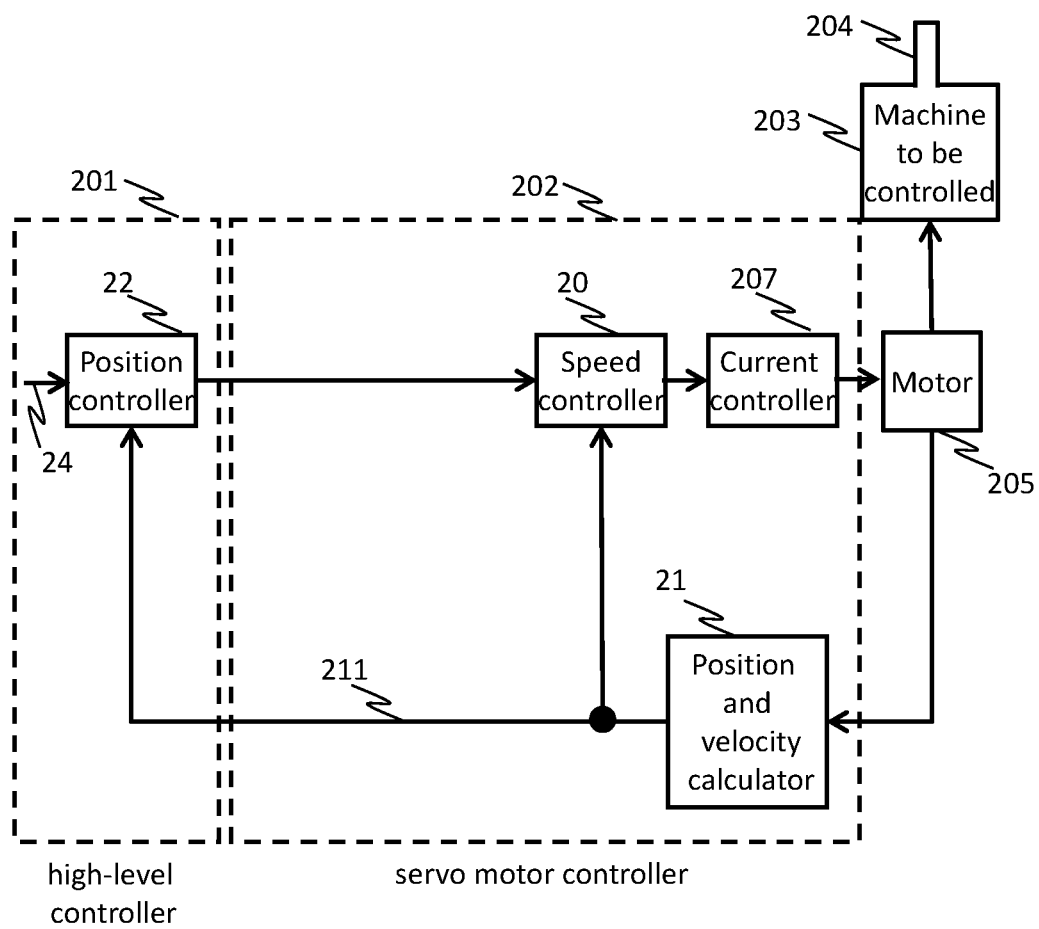
FIG. 2: The figure shows a configuration comprising a high-level controller and servo motor controller.

FIG. 1 shows the configuration of the vibration controller in speed control system 15 in this example. The phase regulator 1, adder and subtractor 3, adder and subtractor 17, and unit converter 12 are newly added to the vibration controller in speed control system 302 in the servo motor controller 301 of FIG. 3.

This example is based on the assumption that the motor control system consists of a high-level controller 201 and a servo motor controller 301, as shown in FIG. 3. The servo motor controller 301 in this example is included in the position control system that controls the position of the machine end connected to the motor.

The high-level controller 201 generates the location directive 24, includes the position controller 22, and receives the motor axis position response 23 from the servo motor controller 301, based on the location directive 24 and the motor axis position response 23, the position controller 22 generates a speed directive 14 and outputs it to the servo motor controller 301. The location directive 24 may be given by another high-level device or other device external to the high-level controller 201.

The servo motor controller 301 in this example includes a speed controller 20, a current control system 207, a position and velocity calculator 21, and a vibration controller in the speed control system 15, which receives the speed directive 14 from the high-level controller 201 and controls the speed of the motor. The position of the motor axis is calculated by the position and velocity calculator 21 based on the measurement signal from the sensor (e.g., rotary encoder) attached to the motor that can determine the position and velocity, which is used as the motor axis position response 23 and the motor axis position response 23 is output to the high-level controller 201.

The servo motor controller 301 has a central processing unit (CPU), which is not shown in the figure. Vibration controller in speed control system 302 including position command estimator 9, parallel vibration damping controller 10, adder and subtractor 304 etc., speed controller 20, position and velocity calculator 21, current control system 207 are executed by the CPU reading the program and executes the program and each processing units are executed. Hardware such as an ASIC (Application Specific Integrated Circuit) or FPGA (Field Programmable Gate Array) can be used to configure all or part of each processing part. The high-level controller 201 has a CPU, and the CPU executes the program corresponding to the position controller 22.

In this example, the position controller 22 of the high-level controller 201 does not include damping control, and damping control is realized inside the servo motor controller 301. The problem is to improve the response delay peculiar to damping control, and the vibration controller in speed control system 15 is the vibration controller in this example to achieve this.

The speed directive 14 can be processed to achieve damping control. In principle, the following steps are required to achieve this.

S1: Understanding and estimation of location directive
S2: Extract frequency components that excite machine edge vibration from the location directives that have been ascertained and estimated.
S3: Generate a speed directive that does not include the frequency components extracted in S2, and make it the speed directive of the speed controller.

Step S1 is realized by position command estimator 9. An example of the means of realization is the following formula. Position command estimator 9 outputs as the estimated value of the location directive the signal obtained by processing the first speed directive 14 with an estimation filter and the motor axis position response 23 according to formula (2), and adding them with the third adder and subtractor.

[Formula 2]

$$r_e = F_p \cdot s_r + y_p \tag{2}$$

However, re, sr, and yp are the location directive estimate 13, speed directive 14, and motor axis position response 23, respectively, and Fp is an estimation filter that matches the inverse characteristics of the position controller 22. For example, if position controller 22 is a P controller, Fp is the inverse characteristic of the P controller, i.e., the inverse of the P gain. For simplicity of discussion, it is assumed that the location directive estimate 13 obtained by the position command estimator 9 can estimate the location directive 24 without error.

Step S2 is realized with the vibrating excitation component extractor 11, which is a line enhancer (LE) as a filter, and the line enhancer is already function of formula (1) described above.

Step S3 is realized with unit converter 12 and adder and subtractor 16, which converts the units of the output of the vibrating excitation component extractor 11 from position to speed with unit converter 12 and by removing the unit of output of the vibrating excitation component extractor 11 from the speed directive 14 by Adder and subtractor 16, a speed directive 8 that does not contain frequency components that excite mechanical edge vibrations can be realized. An example of unit converter 12 is the position controller 22 included in the high-level controller 201.

The position controller 22 is responsible for generating a speed directive based on the location directive 24 and the deviation between the location directive 24 and the motor axis position response 23. Therefore, in the vibration controller in speed control system 15, it can play the role of unit converter 12.

The LE in formula (1) of the vibrating excitation component extractor 11 can extract the frequency components that excite mechanical edge vibration from the location directive estimate 13 without phase delay, as shown in FIG. 4. However, LE has the characteristic of advancing the phase in the band lower than the frequency ωn [rad/s] to be extracted (however, the maximum amount of phase advance is π/2 [rad/s]).

Now, consider the following process that subtracts a sine wave whose amplitude is α(0<α≤1) and whose phase is advanced by β(0<β<π/2) from a sine wave whose frequency is ω.

[Formula 3]

$$S_c(t) = \sin(\omega t) - \alpha \sin(\omega t + \beta) \tag{3}$$

A variant of this formula is as follows.

[Formula 4]

$$S_c(t) = \sqrt{1 - 2\alpha \cos \beta + \alpha^2} \cdot \sin(\omega t + \gamma) \tag{4}$$

[Formula 5]

$$\gamma = \tan^{-1}\left(\frac{-\alpha \sin \beta}{1 - \alpha \cos \beta}\right) \tag{5}$$

For α(0<α≤1) and β(0<β<π/2), γ is always negative. Therefore, the sine wave Sc(t) obtained by subtracting a sine wave whose amplitude is α(0<α≤1) and whose phase is advanced by β(0<β<π/2) from a sine wave whose frequency is ω is always a sine wave whose phase is delayed relative to a sine wave whose frequency is ω. The amount of phase delay tends to increase when α is large.

Also, consider the following process, which adds a sine wave whose amplitude is α(0<α≤1) and whose phase is advanced by β(0<β<π/2) to a sine wave whose frequency is ω.

[Formula 6]

$$S_c(t) = \sin(\omega t) + \alpha \sin(\omega t + \beta) \tag{6}$$

A variant of this formula is as follows.

[Formula 7]

$$S_c(t) = \sqrt{1 + 2\alpha \cos \beta + \alpha^2} \cdot \sin(\omega t + \gamma). \tag{7}$$

[Formula 8]

$$\gamma = \tan^{-1}\left(\frac{\alpha \sin \beta}{1 + \alpha \cos \beta}\right). \tag{8}$$

γ in formula (8) is always positive for α(0<α≤1) and β(0<β<π/2). Therefore, the sine wave Sc(t) obtained by adding a sine wave whose amplitude is α(0<α≤1) and whose phase is advanced by β(0<β<π/2) to the sine wave of frequency ω is always a sine wave of frequency ω whose phase is advanced relative to the sine wave of frequency ω.

This example uses the principles of formula (6) through (8) to improve the response delay inherent in damping control.

The parallel vibration damping controller 10 shown in FIG. 1 employs formula (1).

Therefore, due to the characteristics of LE, frequency components with a frequency lower than ωn (let ωL) are advanced by LE.

Since the frequency component of the frequency ωL phased by LE with respect to the frequency component of the frequency ωL of the speed directive 14 is reduced by the Adder and subtractor 16, from the principle of equation (3) to equation (5), adder and subtractor 16 output 8, the frequency component of the frequency ωL always has a delay with respect to the same frequency component of the speed directive 14.

In particular, when ωL is close to ωn, the gain is high (i.e., α is large) due to the characteristics of LE.
Therefore, the amount of phase delay is more pronounced when ωL is close to ωn.

This is the cause of the response delay characteristic of damping control in parallel vibration control using LE. This phase delay characteristic delays the frequency components in the band lower than ωn in the speed directive 14, resulting in an overall delay in the speed directive.

This example uses phase regulator 1, adder and subtractor 3, unit converter 12, and adder and subtractor 17 in FIG. 1 to address this problem of the phase being delayed by speed directive 14.

Output 2 of adder and subtractor 3 is a location directive (estimate) in which the frequencies that excite the machine end vibration are removed from the nature of the vibrating excitation component extractor 11, but lower than the frequency ωn frequency components is phase delayed than the location directive estimate 5 (location directive estimate 13), as well as output 8.

The phase regulator advances the delayed frequency components due to the vibrating excitation component extractor 11 and converts the units from position to velocity with the unit converter 12 before adding them to output 8 with the adder and subtractor 17 to add them to output 8.

As a result, according to the principle of formula (6) to (8), it is possible to advance the phase delay of output 8 that has a phase delay in frequency components lower than ωn due to the vibrating excitation component extractor 11, resulting in. As a result, the response delay specific to damping control can be improved.

In other words, this example improves the phase delay of speed directive 14 caused by vibrating excitation component extractor 11, thereby improving the delay of speed directive 18 (hereafter, The real speed directive 18 is the speed directive of the speed controller 20, Note that since output 2 does not include frequency components that excite vibration at the machine end, the real speed directive 18 obtained by adding output 7 of unit converter 12 to output 8 with adder and subtractor 17 is still a speed directive with a damping effect that does not excite vibration at the machine end.

An example of phase regulator 1 is the first-order high-pass filter (HPF) shown below.

[Formula 9]

$$HPF(s) = (h-1) \cdot \frac{s}{s + \omega_h}. \tag{9}$$

However, ωh is the cutoff frequency [rad/s] and h (>1) is the adjustment gain.

Figure 5:
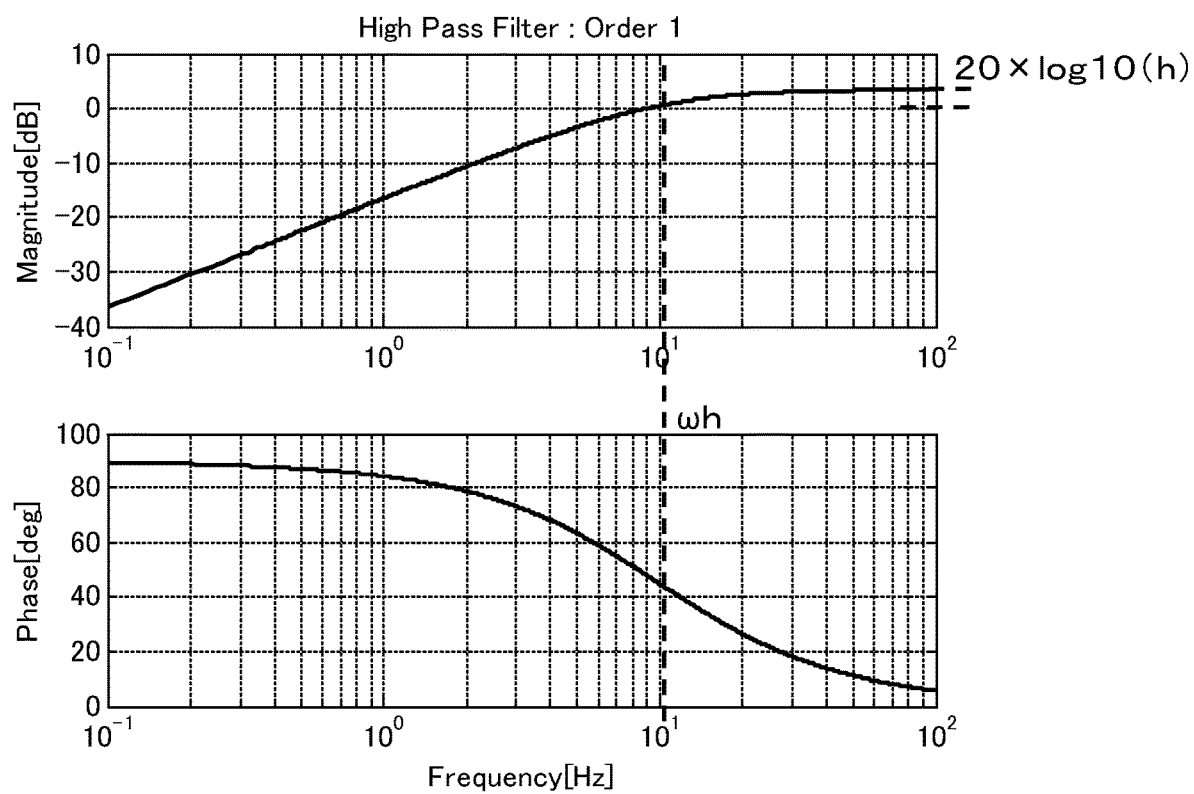
FIG. 5: Frequency characteristics of the phase regulator.

The frequency response of the HPF is shown in FIG. 5 when ωh=2π×10 and h=2.5.

The vertical axis in the upper part of FIG. 5 is Magnitude (amplitude of frequency in HPF) and the horizontal axis is Frequency (frequency of waveform in HPF). The vertical axis in the lower part of FIG. 5 is Phase (phase of the frequency in HPF) and the horizontal axis is Frequency (frequency of the waveform in HPF).

The phase advances by π/4 [rad/s] at the frequency ωh, and advances by a maximum of π/2 [rad/s] in the band lower than the frequency ωh. The gain characteristic increases by 20×log 10(h) in the high frequency range.

Therefore, the phase delay of speed directive 14 can be improved by using formula (9).

The parameters ωh and h in formula (9) have design freedom. For example, if the cutoff frequency is matched to the frequency ωn extracted by LE (ωh=ωn), the response rise delay to the ramp command can theoretically be improved linearly with increasing h.

The response characteristics of machine end vibration are often expressed by the following formula (10).

[Formula 10]

$$AR(s) = \frac{2\zeta_a \omega_a s + \omega_a^2}{s^2 + 2\zeta_s \omega_a s + \omega_a^2} \tag{10}$$

However, ωa is the frequency of the machine end vibration [rad/s] and ζa the damping coefficient.
To extract the vibration frequency of the machine end by LE, we can set ωa=ωn.

With respect to the design of the HPF parameters, if the frequency response of the AR in formula (10) is known, it may be taken into account.

Figure 6:
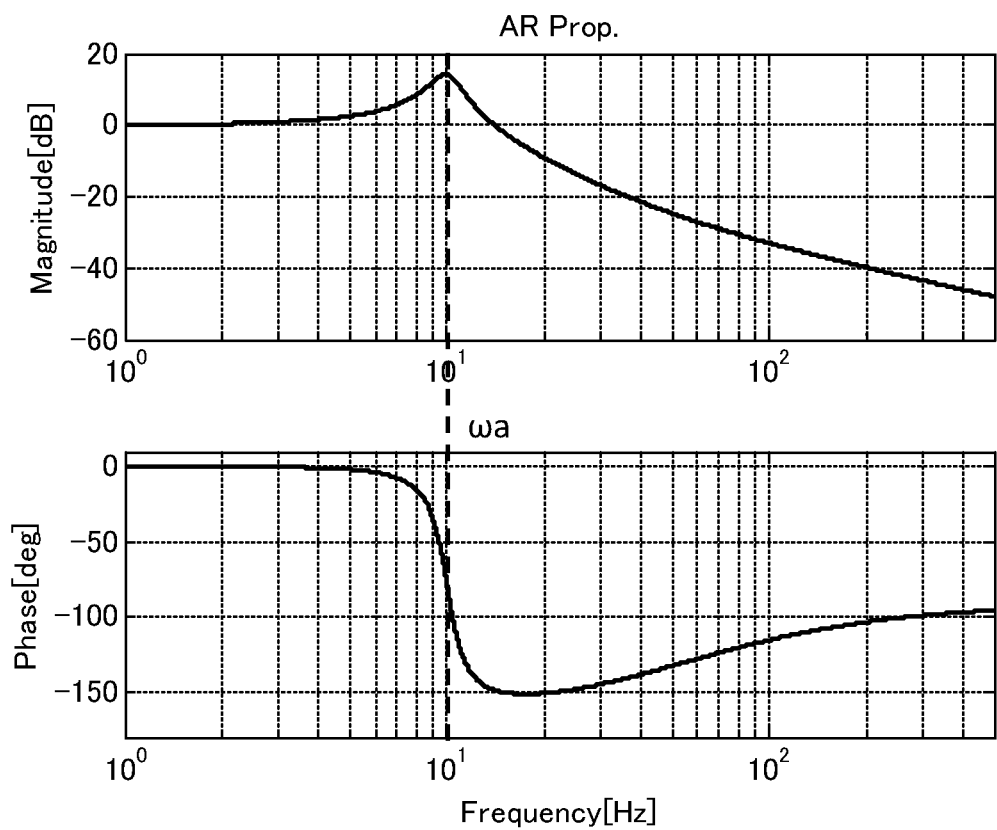
FIG. 6: Frequency characteristics of the machine end.

The frequency response of AR is shown in FIG. 6. Note that ωa=2π×10 and ζa=0.1.

The upper vertical axis in FIG. 6 is Magnitude (amplitude of frequency in AR) and the horizontal axis is Frequency (frequency of waveform in AR). The vertical axis in the lower part of FIG. 6 is Phase (phase of the frequency in AR) and the horizontal axis is Frequency (frequency of the waveform in AR).

The AR is characterized by a phase delay and attenuated gain at higher frequencies than ωa. Therefore, in the HPF, ωh (ωa, ζa) and h (ωa, ζa) are set as functions of AR, and ωh (ωa, ζa)>ωa to actively advance the phase in the high frequency range and h (ωa, ζa)>2 to actively increase gain in the high frequency range. The filter parameters of the phase regulator are set based on the vibration characteristics of the machine end (vibration frequency and vibration damping coefficient).

The reason why such an aggressive design of the HPF is possible is that output 2, the input of the HPF, does not contain any frequency components that excite vibration at the mechanical end.

Thus, according to this example, in providing a motor control system in which the high-level controller includes a position controller and is equipped with a means to realize damping control in the motor servo control unit that is responsible for the speed control system, the response delay peculiar to damping control caused by the parallel vibration damping controller 10 can be improved by a simple process, resulting in shorter positioning time.

EXAMPLE 2

Figure 7:
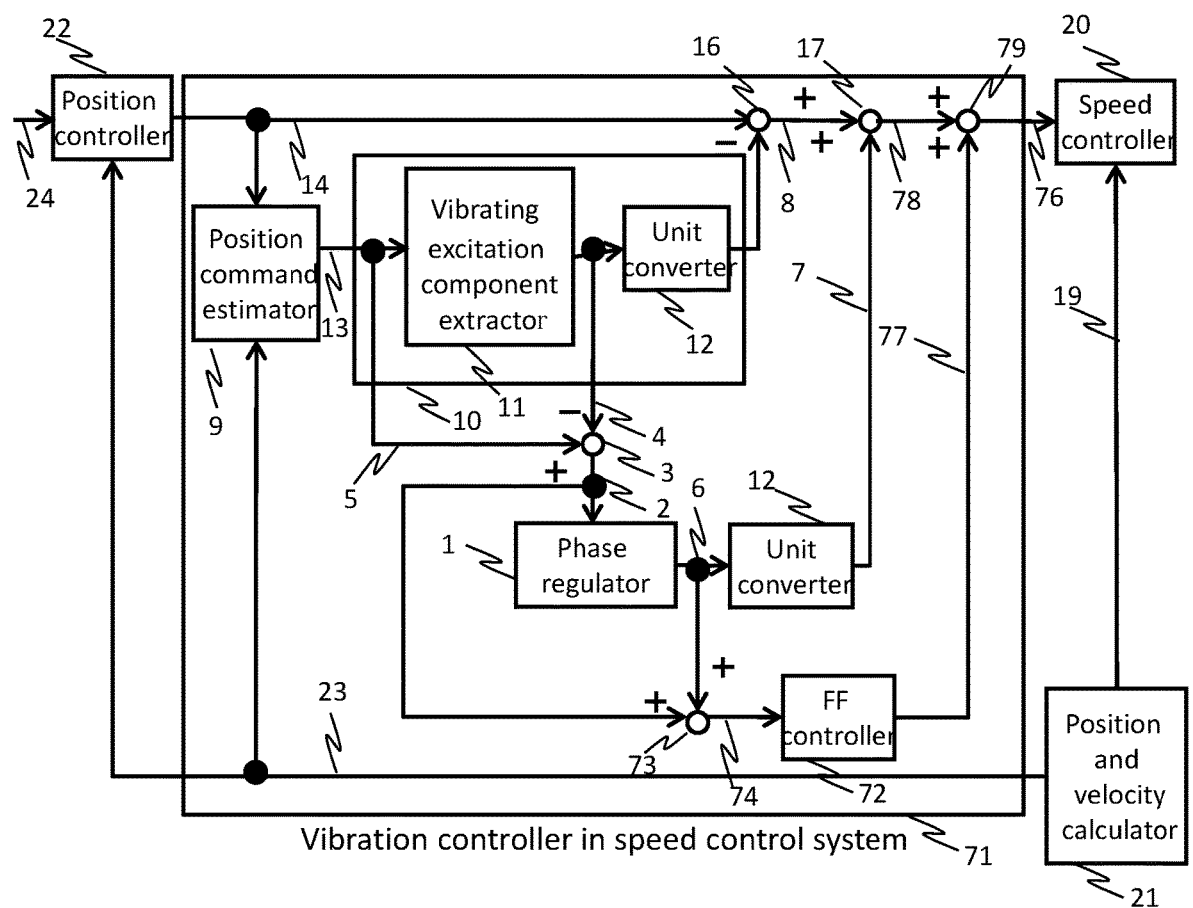
FIG. 7: The first basic configuration of Example 2.

FIG. 7 shows the configuration of the vibration controller in speed control system 71 in this example, with the difference that FF controller 72, adder and subtractor 73, and adder and subtractor 79 are added compared to Example 1.

The same details as in Example 1 are omitted.

Figure 8:
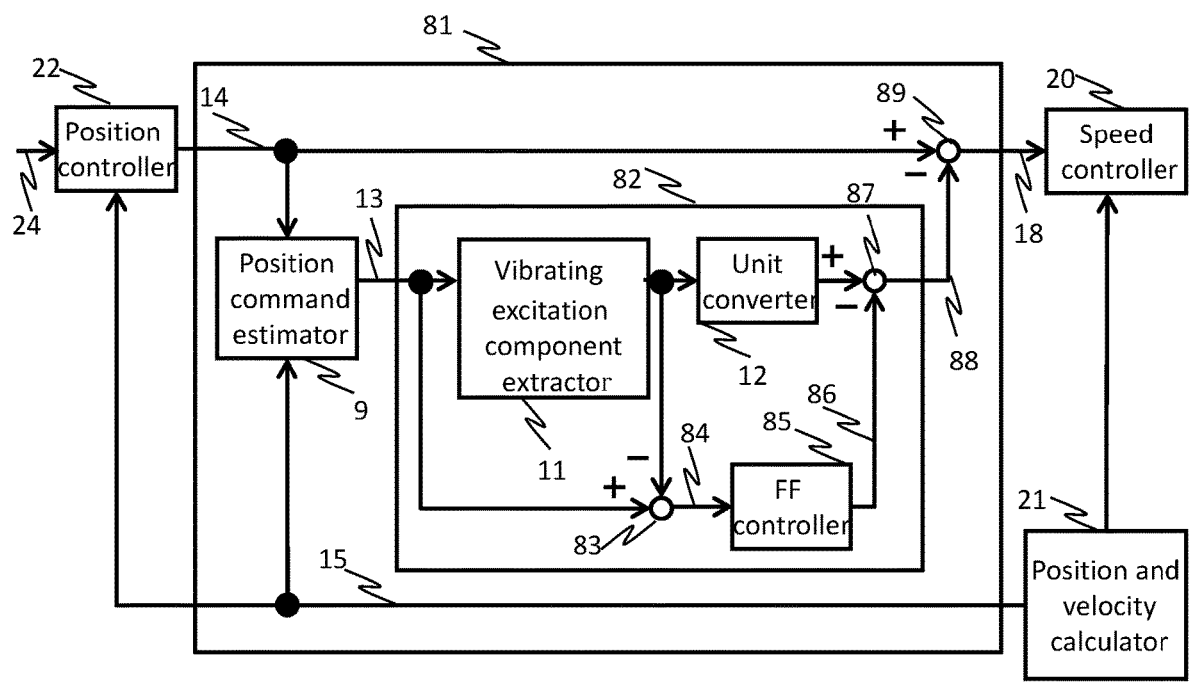
FIG. 8: Diagram explaining the premise of Example 2.

The configuration of the vibration controller in speed control system 81, which is the premise for this example, is shown in FIG. 8. In FIG. 8, the FF controller 85 is provided for the purpose of improving response characteristics when the position controller 22 of the high-level controller does not include the FF controller. However, FF controller 85 improves the response delay of the FB loop caused by the FB controller included in position controller 22, and is not introduced to improve the response delay specific to damping control.

The FF controller 72 in this example plays the same role as the FF controller 85 in FIG. 8 and is provided to improve the response delay of the FB loop caused by the FB controller included in the position controller 22.

Since the control target of a semi-closed position control system is generally a simple integrator 1/s, the FF controller in the position control system is simply the product of the scalar gain and the differentiator s. In the position controller, the FF controller in the position controller as shown in FIG. 9.

Figure 9:
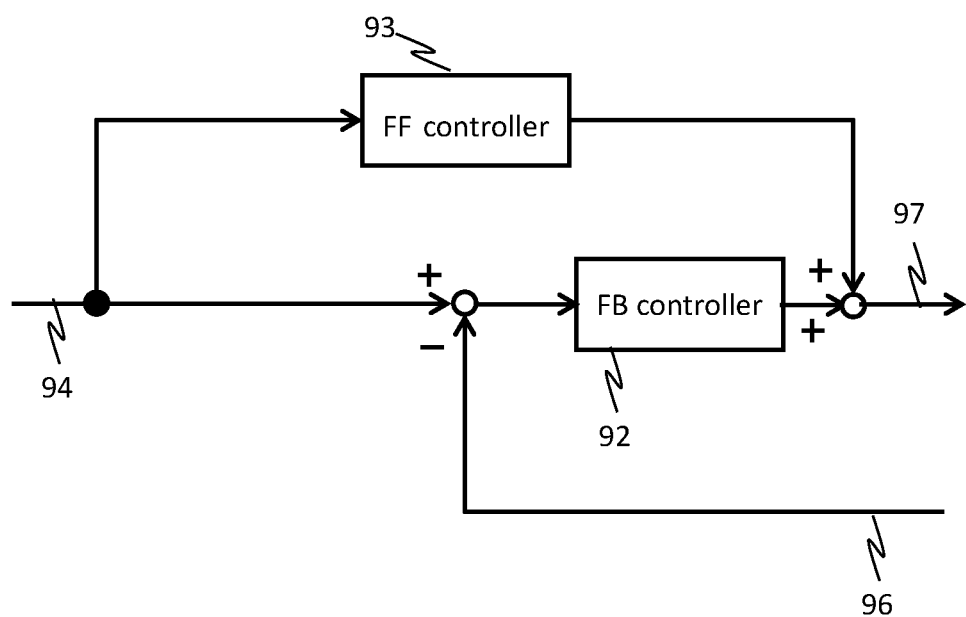
FIG. 9: Specific configuration of the 2-DOF controller with FF CONTROLLER.

FIG. 9 shows the specific configuration of a 2-DOF controller with a general FF controller. In FIG. 9, the input 94 of the FF controller is a location directive.

The response 96 of the controller is the response of the controlled object, such as the output from the position and velocity calculator 21 in FIG. 8.

The input of the FB controller 92 is the difference between the location directive 94 and the response 96 of the controlled object. The output 97 of the position controller is the speed directive. Thus, the FF controller 93 has the property that the input can be in units of position and the output can be in units of speed.

Note that the FB controller 92 in FIG. 9 is often used as a P controller, and therefore the FB controller 92 should simply be a scalar gain (described as ωp). Note that the position controller 22 in FIG. 7 is also a P controller with gain ωp at this time.

Figure 10:
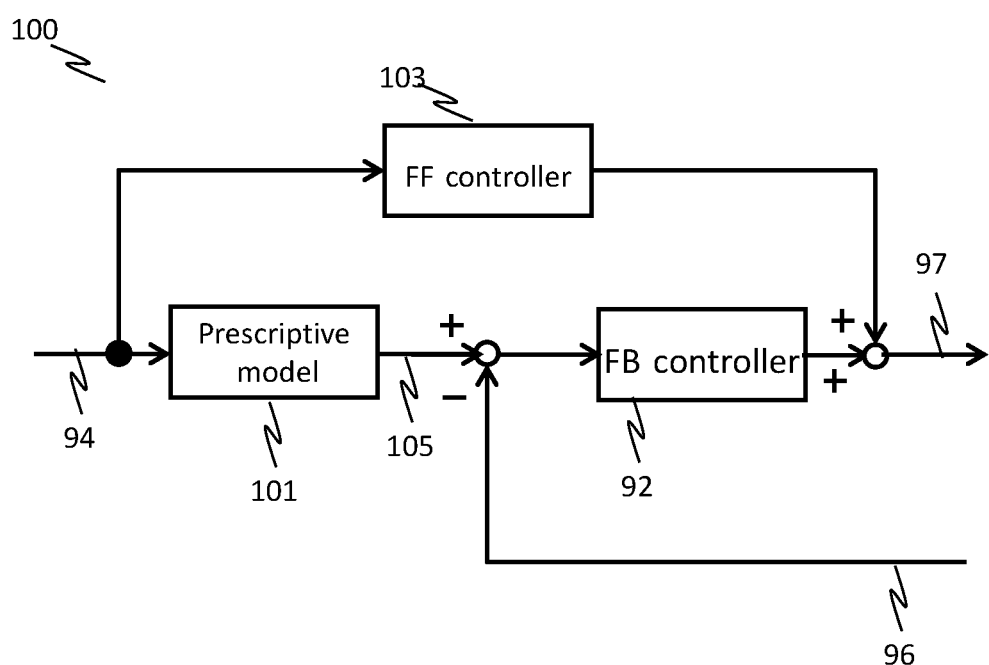
FIG. 10: Specific configuration of the model matching 2-DOF controller.

When the model matching 2-DOF control 100 is configured with a position controller, the FF controller 103 should be set up as shown in FIG. 10, accompanied by the normative model 101. In this case, the FF controller 103 and the normative model 101 should be the following formula as FFM and M, respectively.

[Formula 11]

$$FFM(s) = \frac{M(s)}{1/s} = \omega_f \cdot \frac{s}{s + \omega_f}. \quad (11)$$

[Formula 12]

$$M(s) = \frac{s}{s + \omega_f}. \quad (12)$$

However, ωf is a parameter that defines the desired response characteristics and is generally designed as ωp<ωf.

The FF controller 72 in FIG. 7 can be the FF controller 93 in FIG. 9. Furthermore, FF controller 72 can be the FF controller in the model matching 2-DOF control 100 of FIG. 10. In that case, however, FF controller 72 should be the next equation instead of directly using FF controller 103 in FIG. 10. This is the FF controller 93 when the block configuration in FIG. 10 is transformed into the form shown in FIG. 9.

[Formula 13]

$$FF(s) = \left(\frac{\omega_f}{\omega_p} - 1\right) \cdot \frac{s}{s + \omega_f} \cdot \omega_p \equiv (h_f - 1) \cdot \frac{s}{s + \omega_f} \omega_p \equiv HPF_F(s) \cdot \omega_p \quad (13)$$

According to formula (13), FF controller 72 in FIG. 7 can be interpreted as the product of high-pass filter $HPF_F$ and position controller 22, if model matching 2-DOF control is employed. Furthermore, it can also be interpreted as the product of the high-pass filter $HPF_F$ and unit converter 12.

The high-pass filter $HPF_F$ can be compared with formula (9), which shows that the cutoff frequency is ωf and hf=ωf/ωp corresponds to the adjustment gain.

The filter parameters of the feed-forward controller are set based on the vibration characteristics of the machine end (frequency of vibration and damping factor of vibration).

Therefore, when adopting the FF controller 72 configured in formula (13), it can be seen that in the configuration of FIG. 7, the speed directive 78, in which the response delay peculiar to damping control is improved by the phase regulator 1, can be obtained by the same phase advance characteristic as in formula (9) to obtain It can be seen that speed directive 76 with the specified phase characteristic improved by the FF controller 72 can be obtained. Since this phase advance characteristic plays the role of the FF controller in the position control system, it does not improve the response delay specific to damping control, but improves the response delay of the FB loop caused by the FB controller in the position controller 22.

In FIG. 7, input 74 of the FF controller is the sum of input 2 and output 6 of phase regulator 1 with adder and subtractor 73 in order to avoid that output 77 of FF controller 72 excites machine end vibration, and the reason is to make the output 77, which receives the same phase adjustment result as the speed directive 78 that received the phase adjustment result of phase regulator 1, act on the speed directive 78 via adder and subtractor 79.

Therefore, according to this example with the FF controller 72, the high-level controller includes a position controller, and provides a motor controller with a means to realize damping control in the motor servo controller that is responsible for the speed control system. The response delay peculiar to damping control caused by the parallel vibration damping controller 10 can be improved by a simple process, and the response delay of the FB loop caused by the FB controller can also be improved and as a result, the positioning time can be shortened.

Since ωf defines the desired response characteristic in the FF control and ωp is the control gain of the position controller 22, the parameters in formula (13) are uniquely determined and are designed independently of the response characteristic AR of the machine end vibration. However, hf in formula (13) may be regarded as an adjustment gain, and ωp in hf may be daringly adjustable.

As already mentioned, there is a clear difference in the delay characteristics to be improved between phase regulator 1 and FF controller 72, and it is assumed that they are designed independently. However, it may be possible to shorten the response delay of the machine end while suppressing the machine end vibration as a total by making ωp of hf an adjustment element and designing it appropriately so that it is balanced with the parameters ωh (ωa, ζa) and h (ωa, ζa) of regulator 1.

This effect can be interpreted as the result of adjusting the phase of speed directive 8 using two HPFs, viewing FF controller 72 as playing the same role as the HPF of phase regulator 1.

EXAMPLE 3

Figure 11:
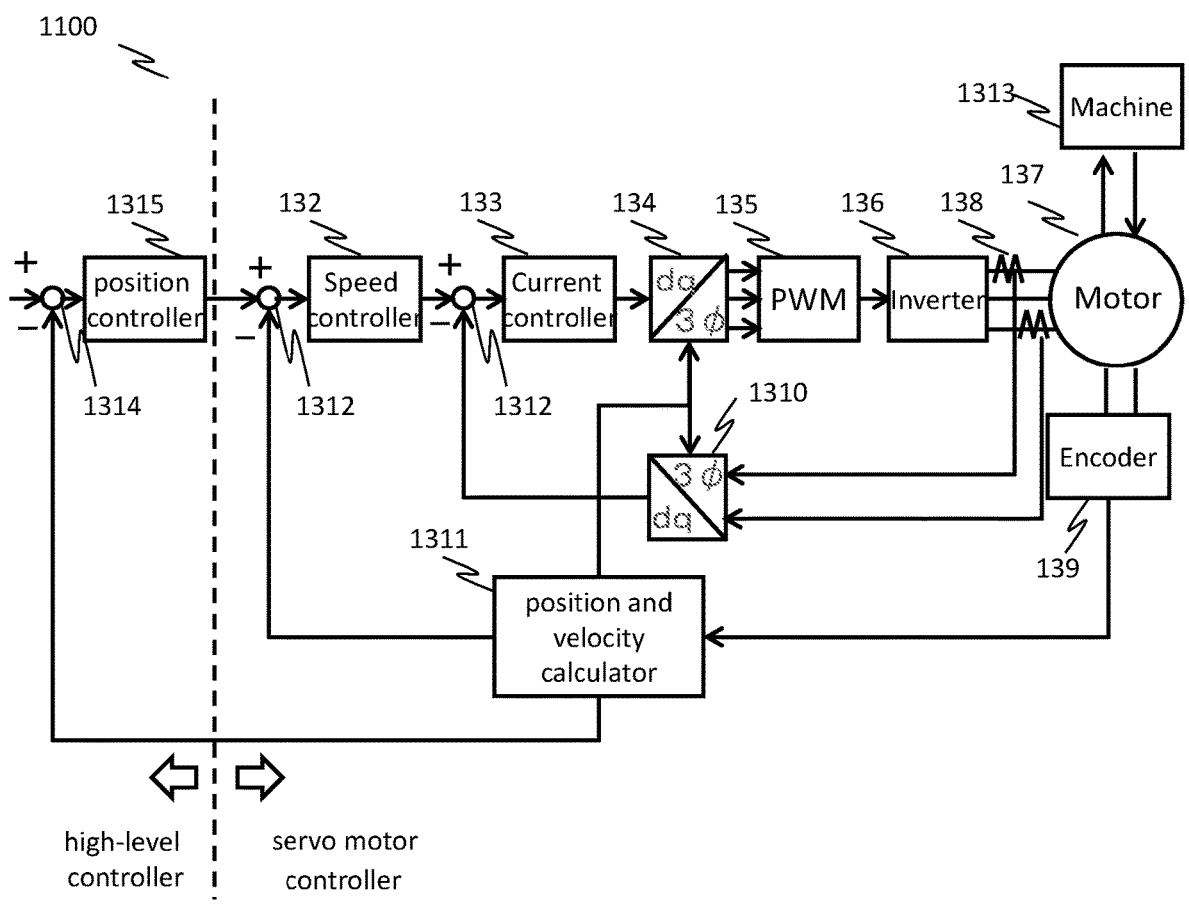
FIG. 11: AC servomotor control system.

The motor controller for this example is intended for application to a cascaded position FB control system 1100 of AC servomotor, which comprising a high-level controller and servo motor controller, as shown in FIG. 11.

Figure 12:
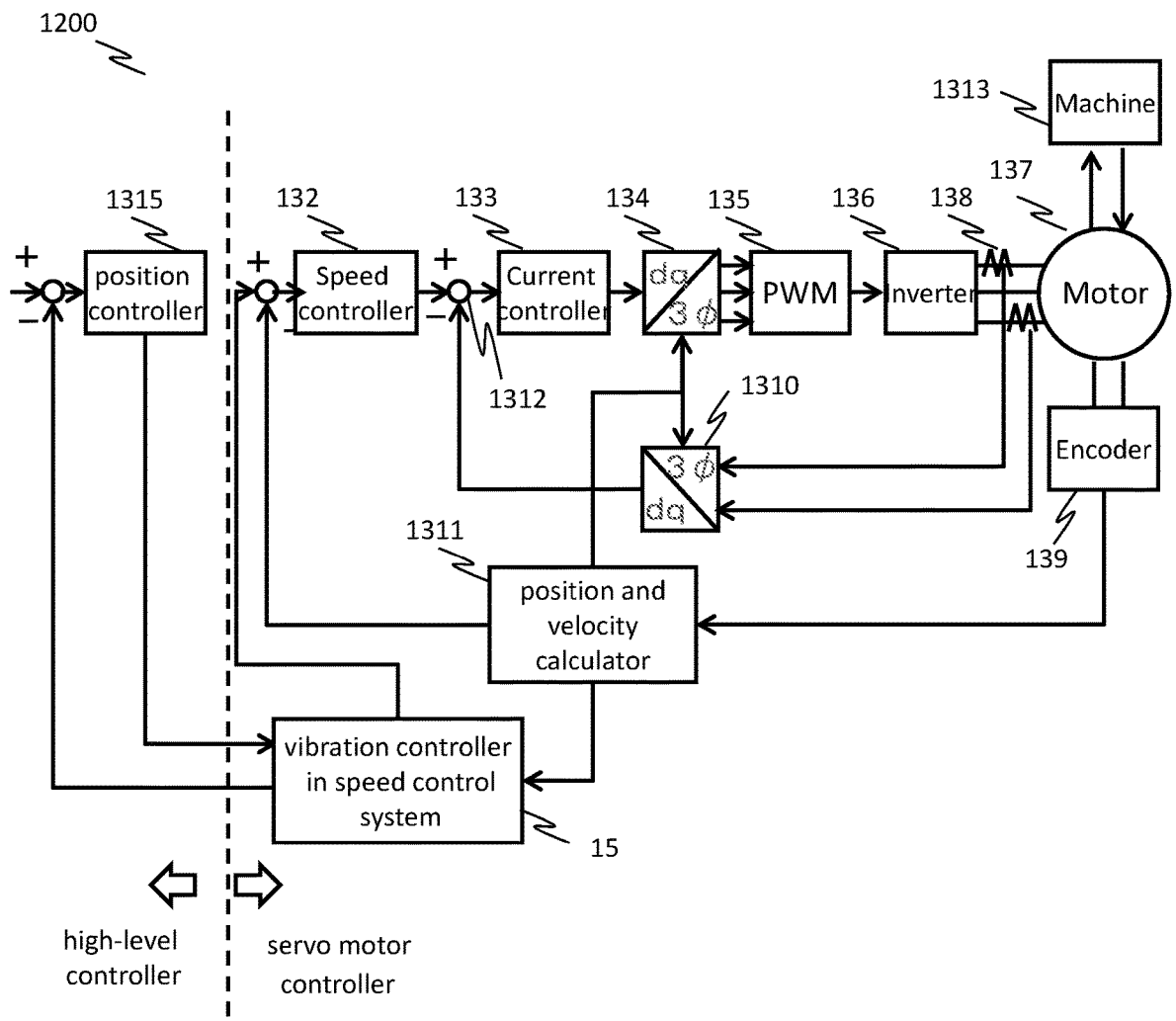
FIG. 12: AC servomotor control system with vibration controller in speed control system.

FIG. 12 shows the cascade position FB control system 1200 of AC servomotor in Example 3. FIG. 12 is the case where the vibration controller in speed control system 15 shown in FIG. 1 is applied to FIG. 11. The same contents as in Example 1 are omitted from the explanation.

The cascaded position FB control system of the AC servomotor shown in FIG. 12 comprising an adder and subtractor 1410, adder and subtractor 1411, adder and subtractor 1412, position controller 1315, speed controller 132, current controller 133, first coordinate converter 134 that converts coordinates from the d-q coordinate system to the 3-phase coordinate system, second coordinate converter 1310 that converts coordinates from the 3-phase coordinate system to the d-q coordinate system, PWM output device 135 that inputs 3-phase voltage command and outputs PWM pulse, inverter (power converter) 136 with switching elements, current detector 138, position and velocity calculator 1311, vibration controller in speed control system 15, encoder 139 to measure motor speed, motor 137 and machine 1313 driven by the motor, which is the controlled object.

The vibration controller in speed control system 15 inputs the motor axis position response calculated by the position and velocity calculator 1311 from the output of encoder 139 and the position operation amount from position controller 1315, and output the motor axis position response to position controller 1315, and output the speed directive to speed controller 132.

The electric circuit part of the motor is controlled by the current controller 133, and in the speed control system under the assumption that this control cycle is faster than the speed controller 132, the current control system is considered to be approximately 1 (the amount of operation of the speed controller is directly delivered to the mechanical part (rotor) of the motor). Therefore, the control object of speed controller 132 is the mechanical part (rotor) of the motor and the machine 1313 coupled to the rotor of the motor, which corresponds to the control object of speed controller 20 in FIG. 1.

In the assumption that the control cycle of speed controller 132 is faster than that of position controller 1315, the speed control system is considered to be approximately 1 in the position control system.

The vibration controller in speed control system 15 is located at the front of the speed control system and processes the speed directive, which is the output of the high-level controller, to generate commands to the speed controller 132.

If the number of inertia of the machine 1313 is 1 and the machine 1313 and the motor rotor are elastically coupled, the control target can be regarded as a two-inertia system with the machine 1313 and the motor rotor coupled by springs and dampers, and the control target has frequency characteristics including one set of resonance and anti-resonance characteristics.

If the number of inertia of the machine 1313 is two and each inertia is coupled by springs and dampers, one of which is elastically coupled to the motor rotor, the control object can be regarded as a three-inertia system where each inertia is coupled by springs and dampers and has frequency characteristics including two sets of resonance/anti-resonance characteristics.

The machine 1313 shall have low stiffness and resonance/anti-resonance characteristics in the low frequency range of several Hz to 100 Hz.

First, consider FIG. 11 without the vibration controller in speed control system 15, where the control gain of the position controller is increased and the motor shaft position response of motor 137 from the location directive is controlled to a high response. If the vibration caused by the resonance/anti-resonance characteristics of the machine 1313 is suppressed by increasing the control gain of the position controller, the end of the machine 1313 becomes oscillatory due to the low rigidity of the machine 1313.

On the other hand, when vibration controller in speed control system 15 is included as shown in FIG. 12, the vibration control effect at the machine end can be demonstrated as explained in Example 1, and the response delay characteristic of damping control can be improved.

Figure 13A:
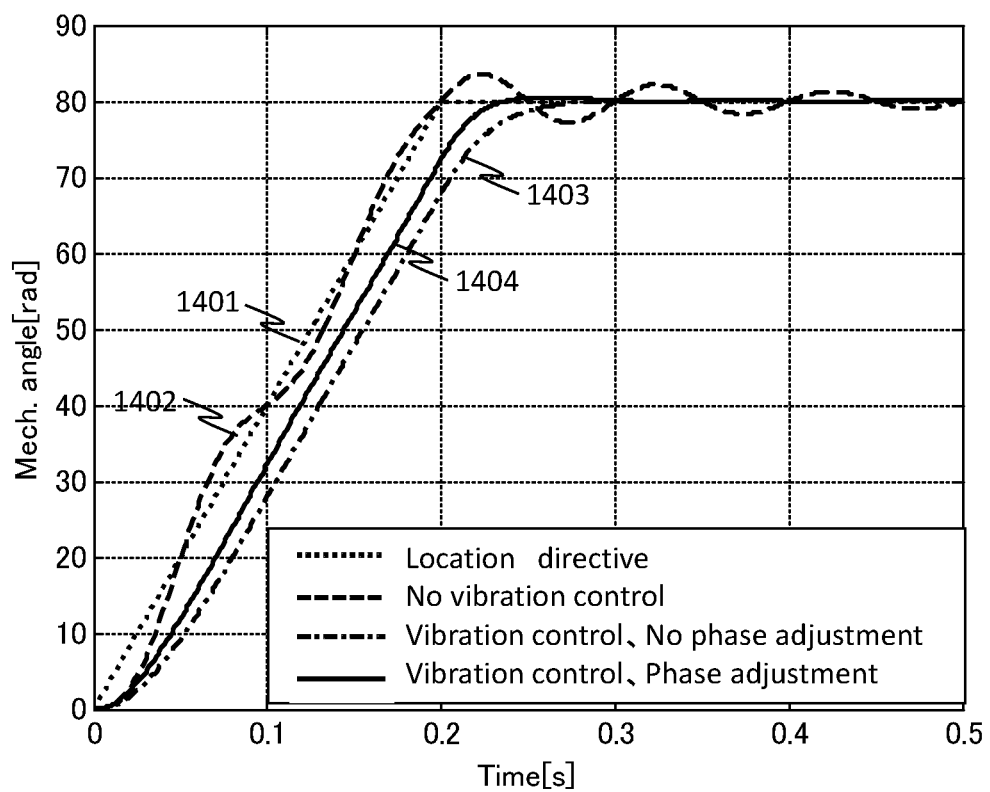
FIG. 13A: The effect of damping control in the configuration of FIG. 12 is shown.
Figure 13B:
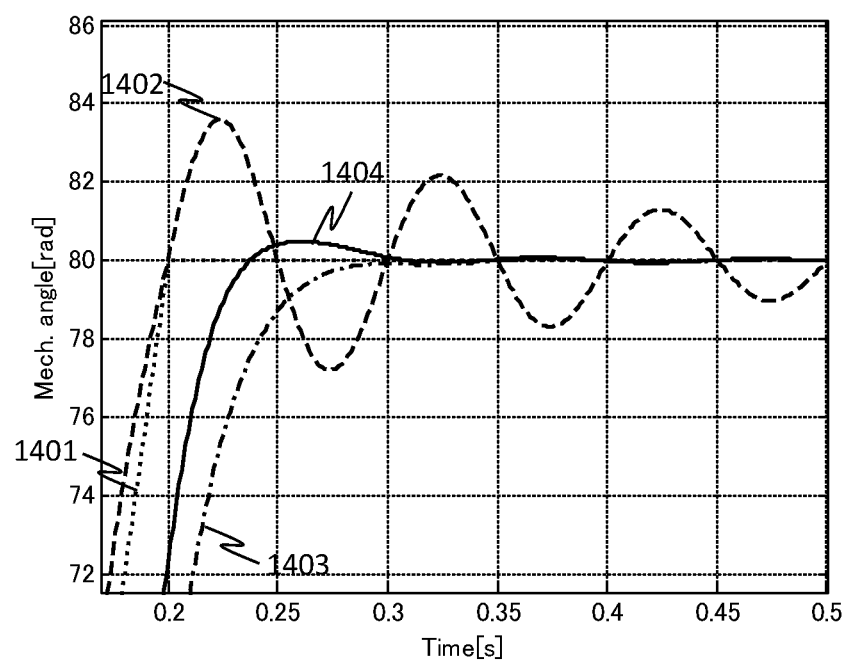
FIG. 13B: Partial enlargement of FIG. 13A.

FIGS. 13a and 13b illustrate the effect of damping control of the AC servomotor control system shown in FIG. 12. The configuration shown in FIG. 12 can improve response delay as well as sufficient damping effect, as shown in FIGS. 13a and 13b.

In FIGS. 13a and 13b, the vertical axis is Mech.angle (machine end position response) and the horizontal axis is Times (time). The position response of the machine end indicates the position moved by the rotation of the motor, which is the end of the machine connected to the motor, and corresponds to the rotation angle (rad) of the motor.

FIG. 13B is a partially enlarged version of FIG. 13A. As shown in FIGS. 13A and 13B, compared to "no damping control" 1402 and "with damping control, no phase adjustment" 1403, "with damping control, phase adjustment" 1404, shown in solid lines in this example, has a higher response performance.

Therefore, according to this example, in a semi-closed AC servomotor control system, the high-level controller includes a position controller and provides a means to realize damping control in the motor servo controller that is in charge of the speed control system. The motor controller is equipped with a means to realize damping control in the motor servo controller that is responsible for the speed control system, and to improve the response delay peculiar to damping control by a simple process.

In this example, the vibration controller in speed control system 15 of Example 1 is applied to the cascade position FB control system 1100 of AC servomotor, speed control system 71 of Example 2 may also be applied to the cascade position FB control system 1100 of AC servomotor.

In addition to AC servomotor control, a cascade control configuration with speed and position controllers is also used in DC motor control, so according to this example, vibration controller in speed control system 15 can be used in the first stage of speed controller. Therefore, according to this example, vibration controller in speed control system 15 can realize vibration control of the machine end within the speed control system by intervening in the speed control system.

REFERENCE SIGNS LIST

1 . . . Phase regulator
9 . . . Position command estimator
10 . . . Parallel vibration damping controller
11 . . . vibrating excitation component extractor
14 . . . Speed directive
15 . . . Vibration controller in speed control system
18 . . . Real speed directive
21 . . . position and velocity calculator
23 . . . Motor axis position response
24 . . . location directive
72 . . . FF controller
136 . . . Inverter
137 . . . AC servomotor
138 . . . Current detector
139 . . . Encoder
201 . . . High-level controller
301 . . . Servo motor controller
1313 . . . machine to be controlled

The invention claimed is:

1. Motor controller device comprising a position control system that controls the position of a machine end connected to a motor,
   wherein the motor controller device receiving the first speed directive from the high-level controller,
   stored in the position control system to output a motor axis position response to the high-level controller,
   comprising speed controller and vibration controller in speed control system,
      wherein the vibration controller in speed control system comprising:
   a position command estimator that calculates an estimate of the location directive based on the first speed directive and the motor axis position response,
   a parallel vibration damping controller that extracts the frequency components that excite vibration of the machine end included in the first speed directive based on the estimated value of the location directive, and outputs the extracted frequency components, the parallel vibration damping controller outputs the extracted frequency components, a phase regulator to improve the response delay caused by the parallel vibration damping controller, a first unit converter that converts the output of the phase regulator into the dimension of velocity, and an arithmetic unit wherein the arithmetic unit, the output of the parallel vibration damping controller is subtracted from the first speed directive to remove from the first speed directive the frequency components that excite vibration at the machine end, and output as a second speed directive, the first real speed directive as an output of the vibration controller in speed control system based on the output of the first unit converter and the second speed directive, uses the first real speed directive as a command for the speed controller.

2. A motor control device according to claim 1, the arithmetic unit comprising, a first adder and subtractor that subtracts the output of the parallel vibration damping controller from the first speed directive and a second adder and subtractor that adds the output of the first unit converter and the second speed directive.

3. A motor control device according to claim 1, the above position command estimator comprising, an estimation filter that matches the inverse characteristics of the position controller included in the high-level controller, and a third adder and subtractor, outputs as an estimate of the location directive the signal obtained by adding the first speed directive processed by the estimation filter and the motor axis position response by the third adder and subtractor.

4. A motor control device according to claim 1, wherein the parallel vibration damping controller comprising, a vibrating excitation component extractor that extracts the frequency components that excite vibration of the machine end included in the first speed directive from the estimated value of the location directive without phase delay. and a second unit converter that converts the units of the vibrating excitation component signal extracted by the vibrating excitation component extractor into the dimension of velocity, outputting the output of the second unit converter as the output of the parallel vibration damping controller, the arithmetic unit calculating the difference between the input and output of the vibrating excitation component extractor, the phase regulator inputs the difference, adjusts the phase, and outputs it to the first unit converter.

5. A motor control device according to claim 4, the arithmetic unit comprising:

a first adder and subtractor that subtracts the output of the parallel vibration damping controller from the first speed directive, a second adder and subtractor that adds the output of the first unit converter and the second speed directive, and a fourth adder and subtractor that subtracts the output from the input of the vibrating excitation component extractor.

6. A motor control device according to claim 1, the vibration controller in speed control system comprising, a feed-forward controller to improve the response delay in feedback control of the position controller included in the high-level controller, the arithmetic unit calculating input and output of the phase regulator, the feed-forward controller inputs the result of the calculation, a second real speed directive is calculated from the output of the feedforward controller and the first real speed directive, output the second real speed directive as the output of the vibration controller in speed control system.

7. A motor control device according to claim 6, the arithmetic unit comprising, a fifth adder and subtractor that adds the input and output of the phase regulator and a sixth adder and subtractor that adds the output of the feedforward controller and the first real speed directive.

8. A motor control device according to claim 6, the feed-forward controller is a high-pass filter.

9. A motor control device according to claim 6, the filter parameters of the feed-forward controller are set based on the vibration characteristics of the machine end.

10. A motor control device according to claim 1, the phase regulator is a high-pass filter.

11. A motor control device according to claim 1, the filter parameters of the phase regulator are set based on the vibration characteristics of the machine end.

12. A motor control device according to claim 1, the high-level controller comprising, a position controller incorporated in said location control system, generating said location directive, the position controller generates the first speed directive from the location directive and the motor axis position response received from the motor controller device.

* * * * *